United States Patent
Tan et al.

[11] Patent Number: 6,129,793
[45] Date of Patent: Oct. 10, 2000

[54] FACE-GEAR FORGING METHOD

[76] Inventors: Jie Tan, 4230 E. University Dr. #228, Mesa, Ariz. 85215; Terrell W. Hansen, 2548 S. El Dorado Rd., Mesa, Ariz. 85202

[21] Appl. No.: 08/909,453

[22] Filed: Aug. 11, 1997

[51] Int. Cl.[7] ............................................. C21D 9/32
[52] U.S. Cl. ................... 148/586; 148/573; 76/4; 76/107.1; 219/69.12; 409/3
[58] Field of Search .................... 148/566, 570, 148/572, 573, 586; 76/4, 107.1; 219/69.12; 409/3

[56] References Cited

U.S. PATENT DOCUMENTS

| | | | |
|---|---|---|---|
| 2,304,586 | 12/1942 | Miller | 29/103 |
| 4,518,287 | 5/1985 | Bossler, Jr. | 409/26 |
| 4,798,077 | 1/1989 | Douglas | 72/360 |
| 5,135,442 | 8/1992 | Bossler, Jr. | 475/1 |
| 5,178,028 | 1/1993 | Bossler, Jr. | 74/416 |
| 5,233,886 | 8/1993 | Bossler, Jr. | 74/665 |

FOREIGN PATENT DOCUMENTS

361235033   10/1986   Japan .
207969   6/1993   Taiwan .

*Primary Examiner*—Sikyin Ip
*Attorney, Agent, or Firm*—Stout, Uxa, Buyan & Mullins, LLP; Donald E. Stout

[57] ABSTRACT

A face-gear forging die which can be used to near-net forge face gears is disclosed. The face-gear forging die is constructed from a blank, and is cut to specification using a wire electrical discharge machining (EDM) process. The wire electrical discharge machining process is computer controlled, according to pre-specified instructions. Accordingly, a variety of different-shaped face-gear forging die may be constructed by merely changing the specification's input to the wire Electric Discharge Machining apparatus. The wire Electric Discharge Machining process can also be used to cut the face gear tooth directly, to thereby circumvent the forging procedure. The complex, curved surfaces of the face gear teeth are mathematically approximated with a ruled surface, and the mathematical approximation is input to the wire Electric Discharge Machining apparatus for subsequent execution and forming of the die.

23 Claims, 7 Drawing Sheets

FACE-GEAR FORGING METHOD

BACKGROUND OF THE INVENTION

1. Field of the Invention

The present invention relates generally to face gears and, more particularly, to methods for forging face gears and the resulting forged face gears.

2. Description of Related Art

Figure 1:
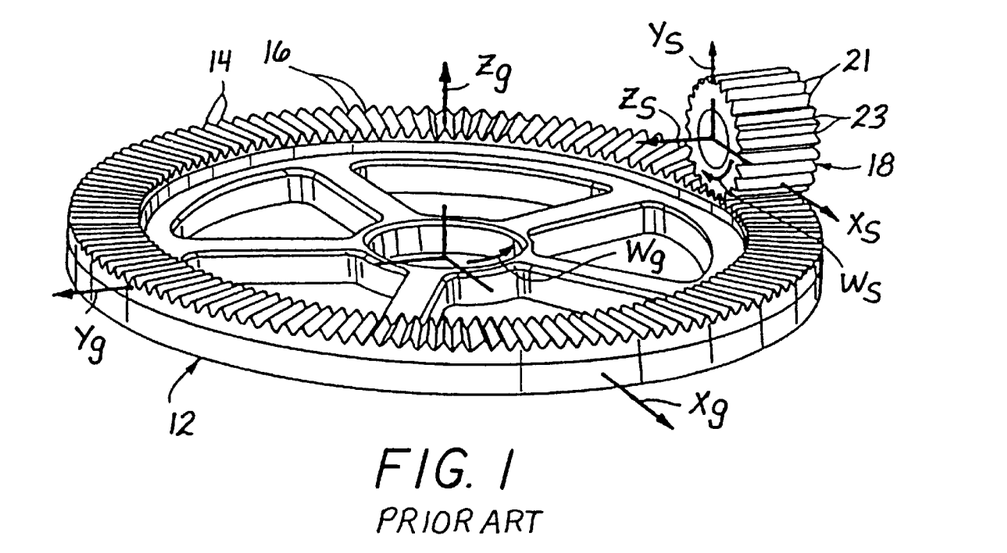
FIG. 1 illustrates a face gear and a shaper of the prior art.

Face gears are widely used in low power applications, but often are not strong enough for use in high power applications. Present manufacturing methods for cutting face gear teeth incorporate hobs or shapers. FIG. 1 illustrates a face gear 12 having face gear teeth 14 and face gear gaps 16. A shaper gear 18 comprises shaper gear teeth 21 and shaper gear gaps 23. The shaper gear 18 rotates about a shaper gear axis of rotation $Z_s$ with a shaper gear rotational velocity $\omega_s$. The face gear 12 rotates about a face gear axis of rotation $Z_g$ with a face gear rotational velocity $\omega_g$. As the shaper gear 18 rolls over the face gear 12, the shaper gear teeth 21 and the shaper gear gaps 23 form the face gear gaps 16 and the face gear teeth 14, respectively. The shaper gear 18 further comprises a shaper gear y-axis $Y_s$ and a shaper gear x-axis $X_s$. The face gear 12 comprises a face gear y-axis $Y_g$ and a face gear x-axis $X_g$.

Figure 2:
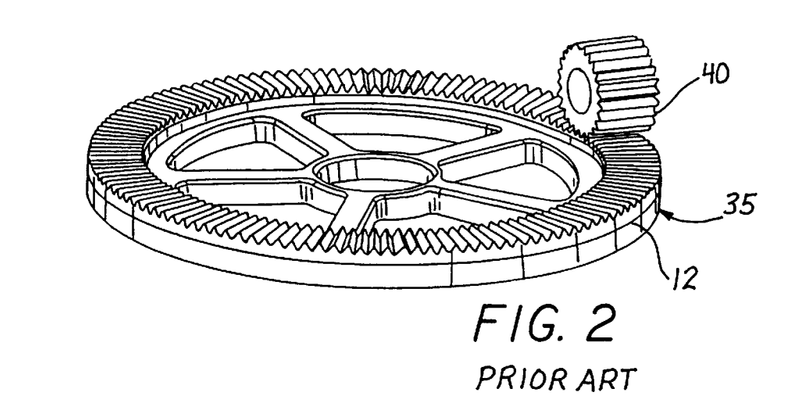
FIG. 2 illustrates a face-gear drive of the prior art.

The face gear teeth 14 and the face gear gaps 16 accommodate a spur gear during regular operation, after the face gear 12 has been shaped by the shaper gear 18 and the shaper gear 18 removed. FIG. 2 illustrates a face-gear drive 35 comprising a face gear 12, and a spur gear 40. The spur gear 40 comprises a conventional involute gear and the face gear 12 is constructed to obey conjugate action with the spur gear 40. The axes of the face gear 12 and of the spur gear 40 intersect and are perpendicular to one another. Face-gear drives having non-intersecting and non-orthogonal axes exist, as well.

The conventional face gear teeth 14 and face gear gaps 16, after being formed by the shaper gear 18 of FIG. 1, are not sufficiently strong for high power applications. The face gear 12 may be case hardened to thereby increase the strength and wear characteristics of the face gear teeth 14 and face gear gaps 16. Case-hardening techniques, such as carburizing and nitriting heat-treat methods, induce distortions in the face gear teeth 14 and gaps 16 of the face gear 12. These distortions prevent smooth operation of the spur pinion on the face gear teeth 14 and, further, the shaper gear 18 is not appropriate for attenuating the distortions in the hardened face gear 12. Grinding processes have been used in the past for finishing gear tooth surfaces in gears other than face gears, when the gears have been heat treated to a high hardness level after being originally cut.

Figure 3:
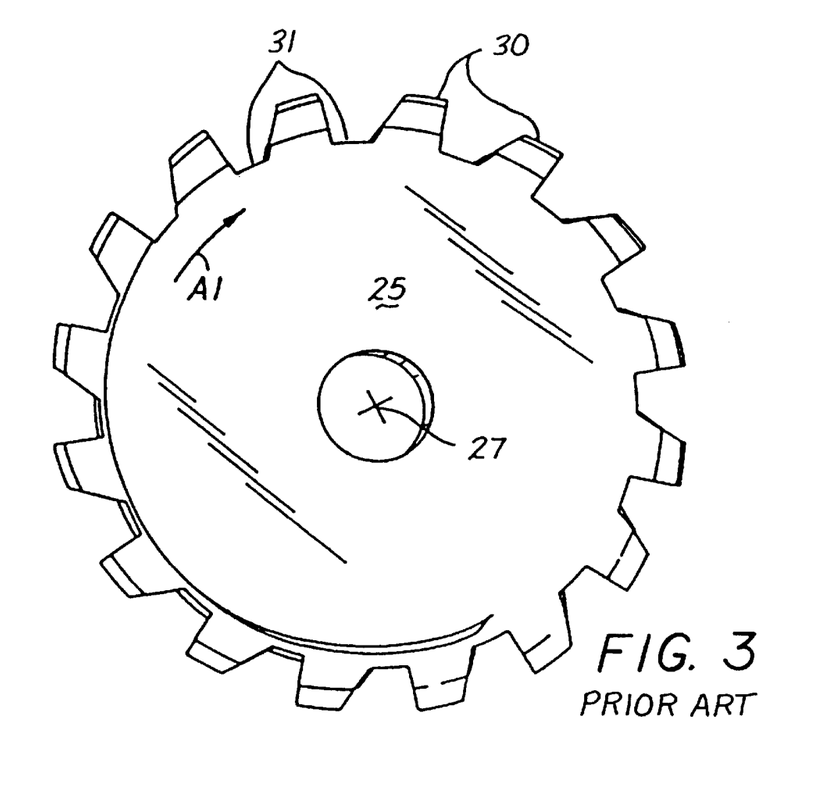
FIG. 3 illustrates a hob of the prior art.

As an alternative to the shaper gear 18, a hob 25 as illustrated in FIG. 3 may be used for forming the face gear teeth 14 and face gear gaps. The hob 25 typically comprises an axis of rotation 27, and a plurality of hob teeth 30 and recessed areas 31 disposed along the perimeter of the hob 25. As the hob 25 is rotated about the axis of rotation 27 in the direction of the arrow A1, the hob teeth 30 cut into the face gear 12 to thereby form the face gear teeth 14 and face gear gaps 16. U.S. Pat. No. 2,304,588 to Miller discloses such a hob used for cutting teeth into a face gear.

Figure 4:
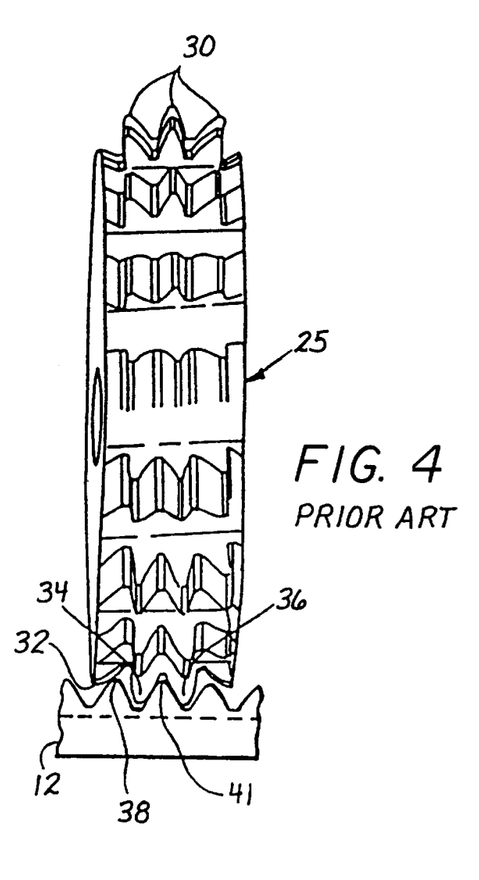
FIG. 4 illustrates a hob and a face gear of the prior art.

An end view of the hob 25 contacting the face gear 12 is illustrated in FIG. 4. The hob 25 comprises a first hob tooth 32, a second hob tooth 34, and a third hob tooth 36. As the hob 25 rotates about the axis of rotation 27 (FIG. 3), the first hob tooth 32 contacts the first face gear tooth 38. Additionally, the second hob tooth 34 and the third hob tooth 36 contact the second face gear tooth 41. The first, second, and third hob teeth 32, 34, and 36 machine (or cut) the first and second face gear teeth 38 and 41. This machining process, however, is not suitable for use on a case-hardened face gear. Additionally, the hob teeth 30 are not properly shaped and, consequently, the face gear teeth 14 of the Miller apparatus are not correctly cut.

Although high-power applications would be desirable for face-gear drives, the conventional gear roughing processes of shaping and hobbing, for example, do not adequately rough the teeth of the face gear. An effective method of roughing the gear teeth of the face gear is required to properly prepare the gear teeth for finishing. One problem associated with prior-art shaping and hobbing techniques is that, being metal cutting processes, these techniques leave gear teeth with interrupted material grain flow. The interrupted material grain flow weakens the strength of the gear teeth. Additionally, relatively high tooling costs are associated with the relatively complex tools required for shaping and hobbing techniques. Shaping and hobbing techniques inherently waste a portion of the metal of the face gear as the face gear is shaped or hobbed. Conservation of the materials comprising the face gear becomes increasingly important as new, expensive materials are considered for aerospace gears, for example.

The prior art has manufactured spur gears, helicle gears, and spiral bevel gears using forging operations. Near-net forging of these particular gears can produce gears which meet sufficient accuracy requirements for subsequent, relatively efficient finishing operations. The forged gears can offer gear teeth having increased strength due to better oriented grain-flow patterns. Additionally, forging of the gears can reduce the amount of wasted metal and can potentially lower tooling and operating costs. Net or near-net forging procedures, however, have not been developed for manufacturing face gears.

SUMMARY OF THE INVENTION

The present invention discloses a face-gear forging die which can be used to accurately forge face gears. The face-gear forging die is constructed from a blank, and is cut to specification using a wire Electric Discharge Machining (EDM) process. The wire electrical discharge machining process is computer controlled, according to pre-specified instructions. Accordingly, a variety of different-shaped face-gear forging die may be constructed by merely changing the specification's input to the wire Electric Discharge Machining apparatus. The wire Electric Discharge Machining process can also be used to cut the face gear tooth directly, to thereby circumvent the forging procedure. The complex, curved surfaces of the face gear teeth are mathematically approximated with a ruled surface, and mathematical approximation is input to the wire Electric Discharge Machining apparatus for subsequent execution and forming of the die.

According to one aspect of the present invention, a method of forming a billet into a face gear comprises a first step of approximating a hyperbolic surface of the face gear with a ruled surface, and a subsequent step of forming the approximated hyperbolic surface on the billet using a wire electronic discharge apparatus to thereby form the face gear. The step of approximating the hyperbolic surface comprises a step of approximating the hyperbolic surface with a ruled surface that comprises a plurality of straight lines. The step of forming the approximately hyperbolic surface comprises a step of passing a wire of the wire electronic discharge apparatus over each of the plurality of straight lines to thereby form the approximated hyperbolic surface. A similar method can also be used to form a blank into a face-gear forging die. According to one aspect of the present invention, a method of making a face gear comprises a first step of forming a blank into a face-gear forging die using a wire electronic discharge apparatus, and a second step of heating a billet. The method comprises a subsequent step of placing the heated billet into contact with the face-gear forging die, and comprises another step of pressing the heated billet against the face-gear forging die to thereby form the heated billet into a face gear. In a subsequent step the face gear is heat treated. In a following step, the heat treated face gear is ground to specification.

According to yet another aspect of the present invention, a method of manufacturing an object from a substrate material comprises a first step of generating a representation of an object having a curved, complex surface by applying a plurality of straight lines to the curved, complex surface. Each of the plurality of straight lines is disposed substantially entirely on the curved, complex surface of the object. The method includes a second step of providing a substrate material, and a subsequent step of manufacturing the substrate material into the representation of the object. The manufactured substrate material comprises a ruled surface which corresponds to the plurality of straight lines. The ruled surface comprises a smooth, curved surface. The step of manufacturing the substrate can comprise a step of forming the ruled surface on the substrate material using a straight cutting surface, and the step of providing a substrate material can comprise a step of providing a metallic substrate material.

The step of generating a representation of the object can be proceeded by a step of providing a numerical representation of the curved, complex surface. The step of generating a representation of the object can comprise a step of generating a representation of a hyperbolic surface of the object. The representation of a hyperbolic surface of the object is generated by first assigning a contact path along the hyperbolic surface, and then choosing a number of surface points on the contact path. Subsequently, a zero-curvature line is determined for each surface point on the contact path. Each zero-curvature line intersects a corresponding surface point and it corresponds to one of the plurality of straight lines. The step of assigning a contact path can comprise a step of assigning a contact path that bisects a length of the object. The material can be manufactured into a face-gear die which is adapted to facilitate forging of a face-gear tooth. Alternatively, the substrate material may be manufactured directly into a face-gear tooth.

The step of generating a representation can comprise a step of applying a plurality of straight lines to a modified surface, wherein the modified surface is slightly different that the curved, complex surface. The step of manufacturing the substrate material can comprise a step of manufacturing the substrate material to have a surface which corresponds to the modified surface. The substrate is manufactured into a face-gear forging die, which is adapted to facilitate forging of a face-gear tooth. The face-gear tooth is adapted to be heat-treated after being forged, and the step of applying a plurality of straight lines to a modified surface is preceded by a step of modifying the curved, complex surface of the object to compensate for distortions in the face-gear tooth which may occur as a result of the heat-treating of the face-gear tooth.

The present invention, together with additional features and advantages thereof, may best be understood by reference to the following description taken in connection with the accompanying illustrative drawings.

DETAILED DESCRIPTION OF THE PRESENTLY PREFERRED EMBODIMENTS

Figure 5:
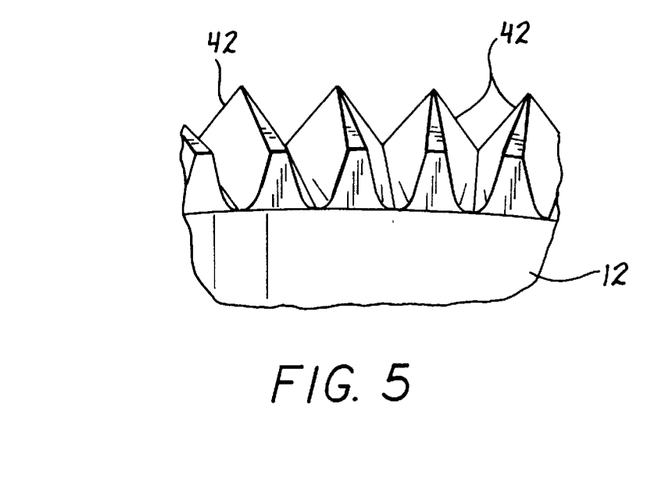
FIG. 5 illustrates a close-up perspective view of face-gear teeth.
Figure 6:
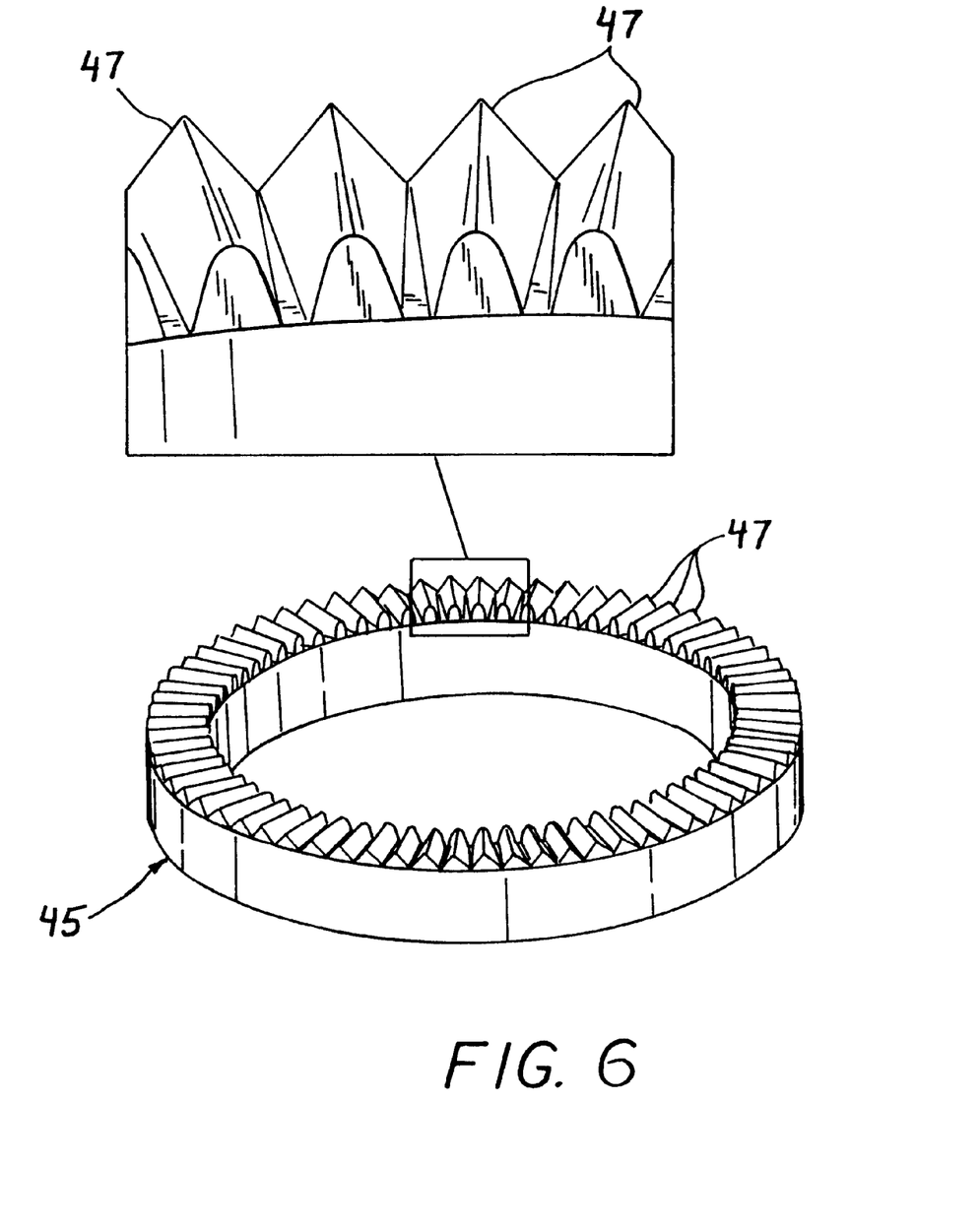
FIG. 6 illustrates a face-gear forging die in accordance with the present invention.

Referring more particularly to the drawings, FIG. 5 illustrates a perspective view of a plurality of face-gear teeth 42 disposed on a face gear 12. FIG. 6 illustrates a face-gear forging die 45, which comprises a plurality of die teeth 47 disposed thereon. The die teeth 47 theoretically comprises negative images of the face gear teeth 42. In accordance with the present invention, the geometrical surfaces of the face-gear teeth 42 can be numerically represented. The geometry of the face-gear teeth 42 can be machined using conventional Computer Numerical Control (CNC) technology, for example.

Since the face-gear teeth 42 and the die teeth 47 share the same surface geometry, a numerical representation of the face-gear teeth 42 can be used to generate a numerical representation of the die teeth 47. The face-gear teeth 42 and the die teeth 47 theoretically share the same surface geometry, but present their physical existence on opposite sides of the surface geometry. The face gear teeth 42 and the die teeth 47 can be theoretically placed together and intermeshed, to form a perfect match. The operation of the die teeth 47 of the face-gear forging die 45 is to forge a billet into a face gear having face-gear teeth 42. Material forged onto the die teeth 47 will be formed into the face-gear teeth 42 of FIG. 5.

The geometry of the face-gear teeth 42 can be determined analytically from the geometry of the spur gear 40 and the relative motion between the spur gear 40 and the face gear 12. The coordinates of the surface points can expressed as functions of two parameters $\theta$ and $\phi$, as shown in Equation 1 shown below.

$$\left.\begin{array}{l} x_g = x_g(\theta, \varphi) \\ y_g = y_g(\theta, \varphi) \\ z_g = z_g(\theta, \varphi) \end{array}\right\} \quad \text{Equation 1}$$

The surface curvatures of each point on the tooth surface can also be determined by mathematical calculations. The present inventors have discovered that all points on the face gear (and thus the face-gear forging die) tooth are of the hyperbolic type.

Figure 7:
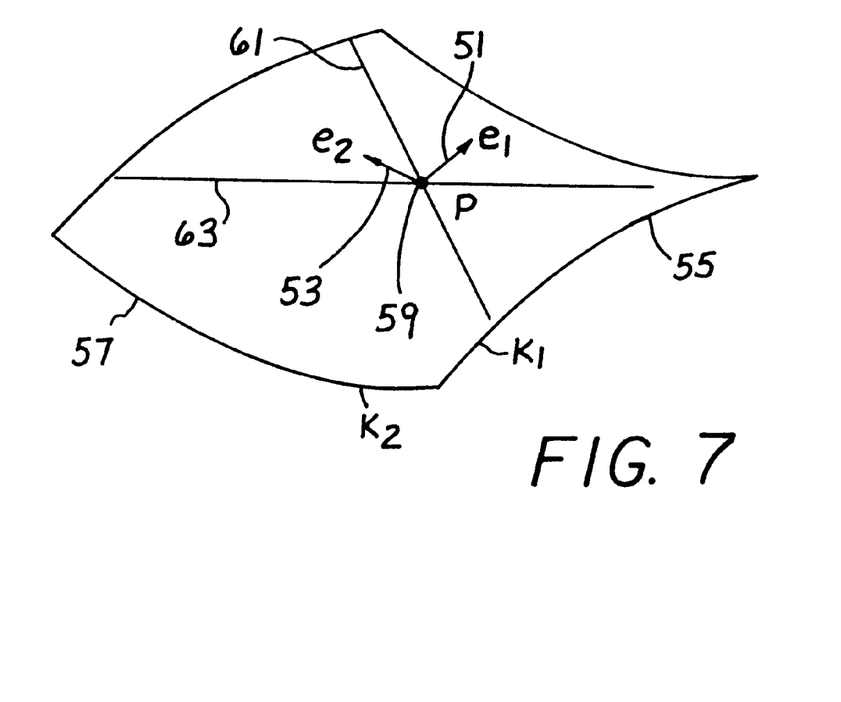
FIG. 7 illustrates a theoretical surface point disposed on a hyperbolic-type surface.

FIG. 7 illustrates a theoretical surface point of hyperbolic type. A surface point is of hyperbolic type if the two principal curvatures of the surface point are of opposite signs. That is, one principal direction is convex and the other principal direction is concave. Between the two principal directions there are two directions along with the surface curvature is zero.

In FIG. 7, a first principal direction $e_1$ is delineated by the reference numeral 51, and a second principal direction $e_2$ is delineated by the reference numeral 53. The first principal direction 51 comprises a convex curvature 55, and the second principal direction 53 comprises a concave curvature 57. The exemplary surface point of hyperbolic type P is shown at reference numeral 59. A first zero-curvature line 61 extends in a first direction between the first principal direction 51 and the second principal direction 53, and a second zero-curvature line 63 extends between the first principal direction 51 and the second principal direction 53. The symbol κ is used to denote the curvature of a surface. This curvature can be expressed, for example, as the size of a radius of a circle which would be required to generate the curvature of the surface. A small curvature would correspond to a circle having a large radius, and a large curvature would correspond to a circle having a small radius. A κ value of 2, for example, would correspond to a circle having a radius of 0.5. The first principal direction 51 has a curvature $\kappa_1$, and the second principal direction 53 has a curvature $\kappa_2$.

The first principal direction 51 and the second principal direction 53 are by definition perpendicular to one another. The curvature at any angle q from the first principal direction 51 can be determined using the following equation.

$$\theta = \theta_1 [\cos(q)]^2 + \kappa_2 [\text{sign}(q)]^2 \quad \text{Equation 2}$$

Figure 8:
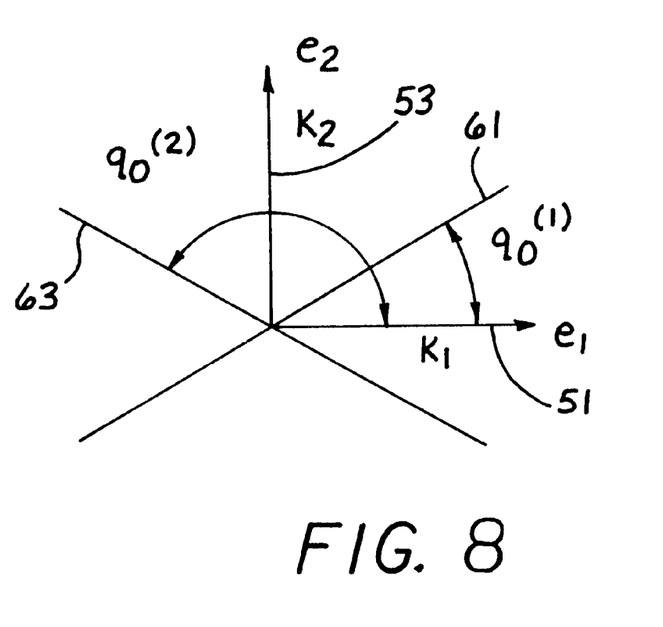
FIG. 8 illustrates principle and zero-curvature directions of a hyperbolic surface point.

As illustrated in FIG. 8, the q value is measured in degrees, for example, from the first principal direction 51. Looking at Equation 2, a q value of zero would correspond to κ being equal to $\kappa_1$, which is the curvature of the first principal direction 51. Similarly, a q value of ninety degrees would correspond to κ being equal to $\kappa_2$, which is the curvature in the second principal direction 53. Letting κ=0 and solving Equation 2 for q yields the following equation.

$$q_0 = \tan^{-1}\left(\frac{\kappa_1}{\kappa_2}\right)^{1/2} \quad \text{Equation 3}$$

This variable $q_o$ denotes the angle where a zero-curvature line occurs. In FIG. 8, the angle $q_o^{(1)}$ designates the angle of the first zero-curvature line 61 from the first principal direction 51, and the angle $q_o^{(2)}$ designates the angle of the second zero-curvature line 63 from the first principal direction 51. Thus, knowing the principal directions 51, 53 and the curvatures $\kappa_1$, $\kappa_2$, the zero-curvature directions $q_o^{(1)}$, $q_o^{(2)}$ can be determined using Equation 3. Equation 3 yields the two solutions for the zero-curvature directions $q_o^{(1)}$, $q_o^{(2)}$.

Figure 9:
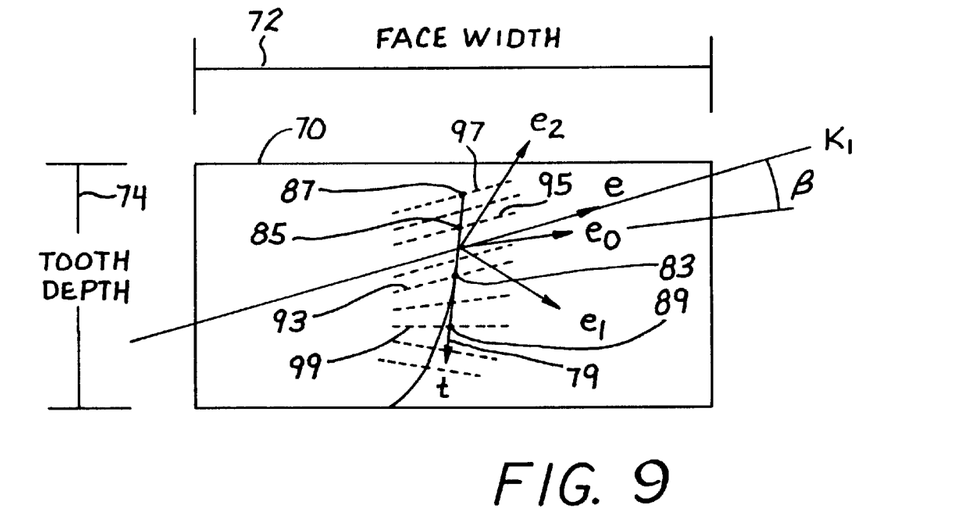
FIG. 9 illustrates a schematic view of a face-gear tooth, with a contact path and a number of zero-curvature lines disposed thereon.

FIG. 9 is a schematic diagram of a face-gear tooth 70 having a face width 72 and a tooth depth 74. The geometry of the face-gear tooth 70, which preferably comprises a hyperbolic surface, can be numerically expressed. The general concept of the presently preferred embodiment is to arbitrarily define a contact path along the surface of the face-gear tooth 70. The contact path preferably bisects the face width 72 of the face-gear tooth 70. As illustrated in FIG. 9, a contact path 79 is chosen to generally extend along the dimension of the tooth depth 74 and to bisect the face width 72. Although the contact path 79 in FIG. 9 is illustrated in a slightly non-parallel fashion to the tooth depth, the presently preferred embodiment arbitrarily defines the contact path 79 as having a direction and length equal to the tooth depth 74. Mathematically this contact path 79 can be expressed as functions of ϕ, which is one of the two surface parameters in Equation 1.

$$\left.\begin{array}{l} x_g^{(c)} = x_g^{(c)}(\varphi) \\ y_g^{(c)} = y_g^{(c)}(\varphi) \\ z_g^{(c)} = z_g^{(c)}(\varphi) \end{array}\right\} \quad \text{Equation 4}$$

A number of the surface points that are chosen along the contact path 79 are shown at 83, 85, 87, 89. Each of the illustrated surface points 83, 85, 87, 89 corresponds to a surface point, such as the surface point 59 of FIG. 7, which is disposed on a hyperbolic-type surface. In the presently preferred embodiment, the contact path 79 is equally divided into a number of surface points or steps.

In the presently preferred embodiment, forty surface points are defined along the length of the contact path 79. A greater number of surface points will generate a more accurate approximation of the hyperbolic surface of the face-gear tooth 70, and a smaller number will provide a less-accurate result. Similarly, a greater number of contact paths 79 positioned along the face width would increase the accuracy of the representation of the face gear tooth 70. The zero-curvature directions $q_o^{(1)}$, $q_o^{(2)}$ are determined using Equation 3 for each of the surface points along the contact path 79.

Equation 3 will generate two zero-curvature directions for each surface point but, according to the presently preferred embodiment, the zero-curvature direction directed approximately in the direction of the face width 72 of the face-gear tooth 70 is chosen. The resulting chosen zero-curvature directions approximate the hyperbolic surface of the face-gear tooth 70.

In FIG. 9, a zero-curvature line 93 corresponds to the surface point 83, a zero-curvature line 95 corresponds to the surface point 85, a zero-curvature line 97 corresponds to the surface point 87, and a zero-curvature line 99 corresponds to the surface point 89. The resulting zero-curvature lines disposed along the length of the contact path 79 designate the wire positions which, as a whole, form a ruled surface with suitable approximation of the face-gear tooth 70.

Figure 10:
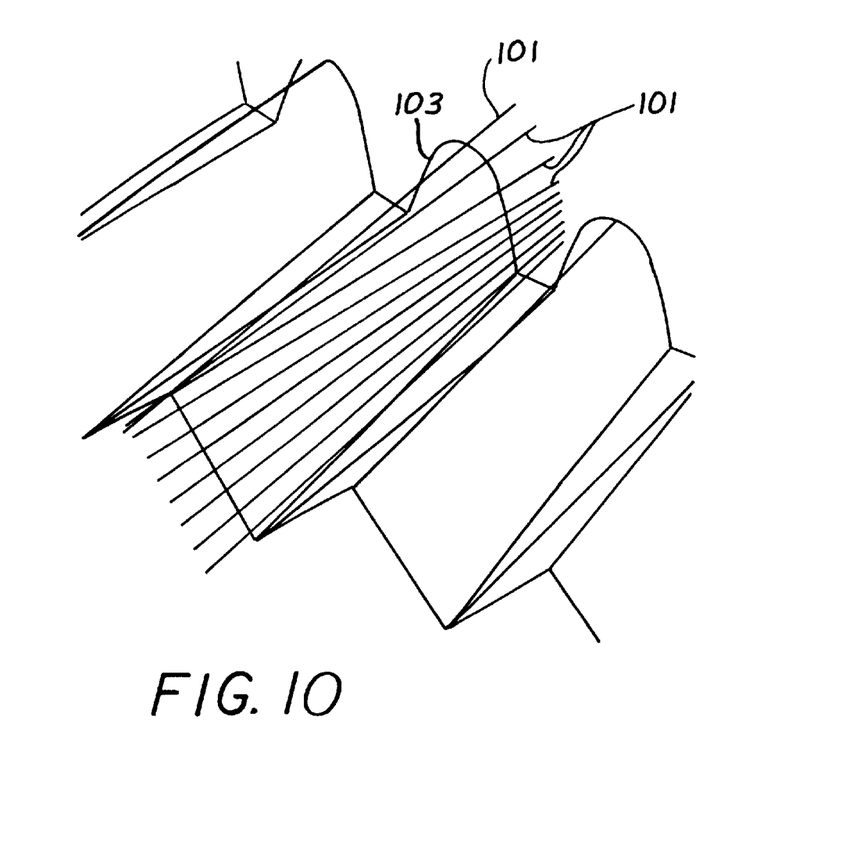
FIG. 10 illustrates a plurality of wire positions disposed over a face-gear forging die tooth in accordance with the present invention.

FIG. 10 illustrates a number of wire positions 101 disposed along the surface of a die tooth 103. The wire positions 101 can be realized on a blank to thereby form a face-gear forging die. The motion of a wire can be controlled by a Computer Numerical Control (CNC) wire Electric Discharge Machining (EDM) apparatus. The wire can be controlled, for example, to move from the top of the tooth to the root to generate a smooth ruled surface.

Figure 11:
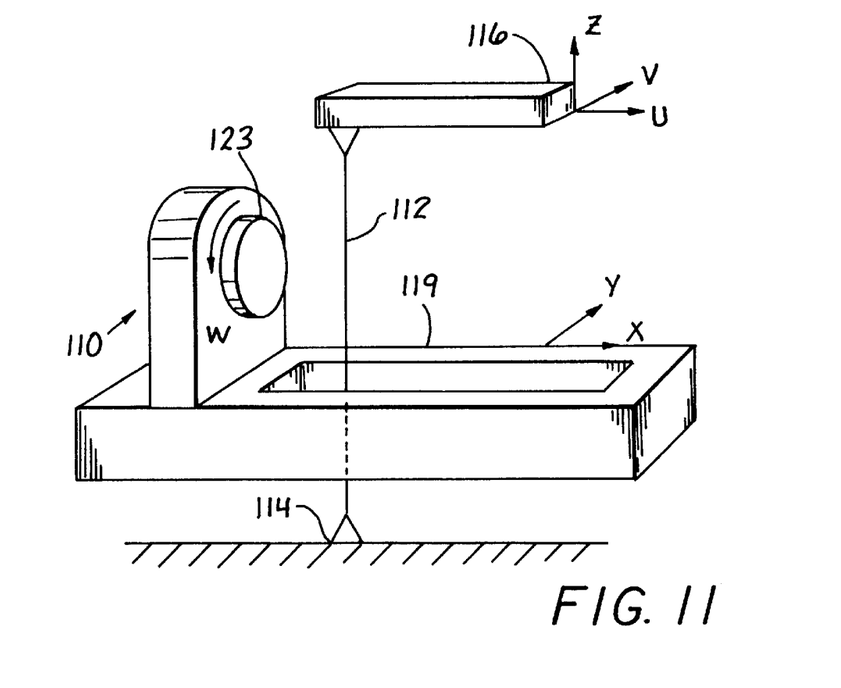
FIG. 11 is a schematic illustration of a wire electric discharge machining apparatus.

FIG. 11 illustrates a schematic diagram of a typical wire electrical discharge machine apparatus 110. The position of the cutting wire 112 is held between a fixed lower guide 114 and a moving upper guide 116. Relative movement of the cutting wire 112 over the blank (not shown) is controlled by movement of the moving upper guide 116 through three degrees of freedom U, V, and Z. Additionally, relative movement of the cutting wire 112 over the blank is controlled by X and Y movement of the linear moving table 119 and, further, by rotational movement W of the rotary table 123. The rotary table 123 is disposed on the linear moving table 119.

Figure 12:
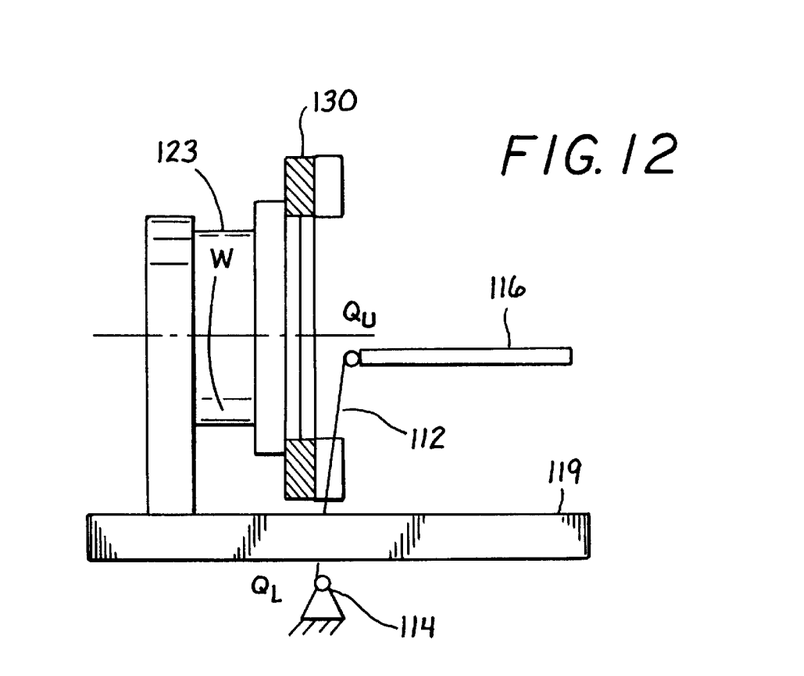
FIG. 12 is a schematic diagram of a wire electric discharge machining apparatus forming a face-gear forging die.

FIG. 12 illustrates a blank being cut by the cutting wire 112 into a face-gear forging die 130. The blank is initially supplied in the form of a ring, and the cutting wire 112 forms die teeth in the face-gear forging die 130. The face-gear forging die 130 is mounted on the rotary table 123, as illustrated in FIG. 12. Machine movements are executed to place the cutting wire 112 over portions of the face-gear forging die, in order to move the cutting wire 112 along the wire positions, such as the wire positions shown at 101 of FIG. 10, for example. Machine movements are converted from the wire positions 110 and controlled by the machine computer numerical control servo drives. The die teeth are cut one at a time, followed by an indexing movement of the rotary table 123 for subsequent cutting of the next die tooth.

Figure 13:
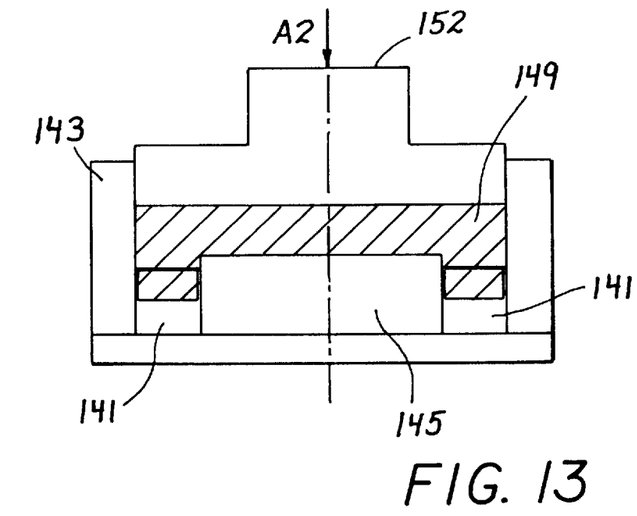
FIG. 13 is a schematic illustration of a face-gear forging assembly.

The resulting face-gear forging die 141 is placed between an outer wall 143 and an inner core 145, as schematically illustrated in FIG. 13. A heated billet 149 is moved into contact with the face-gear forging die 141, and a press 152 is moved in the direction of the arrow A2 to force the heated billet 149 into intimal contact with the face-gear forging die 141. The geometry of the die teeth of the face-gear forging die 141 is subsequently transferred onto the heated billet 149, to form face-gear teeth. The face-gear teeth conform with the geometry of the die teeth of the face-gear forging die 141.

The method and apparatus for generating a face-gear forging die of the present invention can facilitate an effective production technique for forging face gear. Desired face-gear tooth modifications (crowning) can be introduced to the face-gear forging die. These modifications subsequently can be transferred to the face gear in the forging process. The modifications thus provide a means for conveniently and analytically compensating for face-gear tooth distortion, which is introduced in the subsequent heat-treatment process of the face gear. As illustrated in FIG. 9, for example, a slight deviation angle $\beta$ can be introduced to one or more of the zero-curvature lines to thereby introduce modifications into the surface geometry. The computer numerical control technology facilitates introduction of modifications to the surface geometry of the face-gear forging die being cut on the wire electronic discharge machining apparatus. In the subsequent face-gear forging process, the face gear will inherit the modifications, which, if well designed, can make allowances for face-gear tooth distortions which are introduced in the subsequent heat-treatment process. These modifications and/or error compensations can be realized with computer numerical control software, without requiring any tooling changes. This design technique can reduce costs and significantly increase productivity.

A general premise facilitating the manufacture of face-gear forging die, in accordance with the present invention, is the above-described concept of approximating a complex surface of hyperbolic type with a simple, ruled surface. The inventive computational algorithms disclosed herein provide a means of approximating a surface of hyperbolic type with a ruled surface and implementing the approximation on a wire electric discharge machine apparatus. Broader applications including the manufacturing of mechanical components with complex surfaces of hyperbolic type are contemplated by the present invention, in addition to the specifically disclosed manufacture of face-gear die. According to the present invention, simple cutting tools driven by computer numerical control servosystems can be used to generate complex gear tooth surfaces. The simple cutting tools of the present invention are used as an alternative to traditional generating methods which incorporate relatively complex tools.

The disclosed methods of generating complex surfaces can lead to reduced costs in tooling, increased freedom in gear tooth synthesis, and increased flexibility in accommodating design changes and in compensating for manufacturing errors. The inventors are only aware of prior art wire electric discharge machining operations in the context of generating cylindrical and conical surfaces, on which straight generators would appear to be suggested. The present invention facilitates a strategic shift of emphasis in gear manufacturing technology from hardware (tools) to software (mathematics and computer programs). The computer numerical control servosystem, which is commonly equipped with electric discharge machining apparatus, provides the cutting wire with universally controllable movement. Consequently, complex surfaces which are not obtainable with conventional machining processes can be generated using the present invention. The present inventors have found that the problem of making a face-gear forging die using conventional machining processes, such as grinding, would be very difficult.

With the face-gear forging methods described herein, face gears can be forged directly from billets to form the desired face-gear teeth, thus eliminating need for the prior-art shaping or hobbing operations. Forged face gears can have improved tooth strength as a result of better-oriented grain flow patterns. After subsequent operations of surface hardening and grinding on the face-gear teeth, face gears of AGMA Class 10 or higher can be obtained with tooth bending and surface pitting strength satisfying stringent requirements in aerospace power applications.

Figure 14:
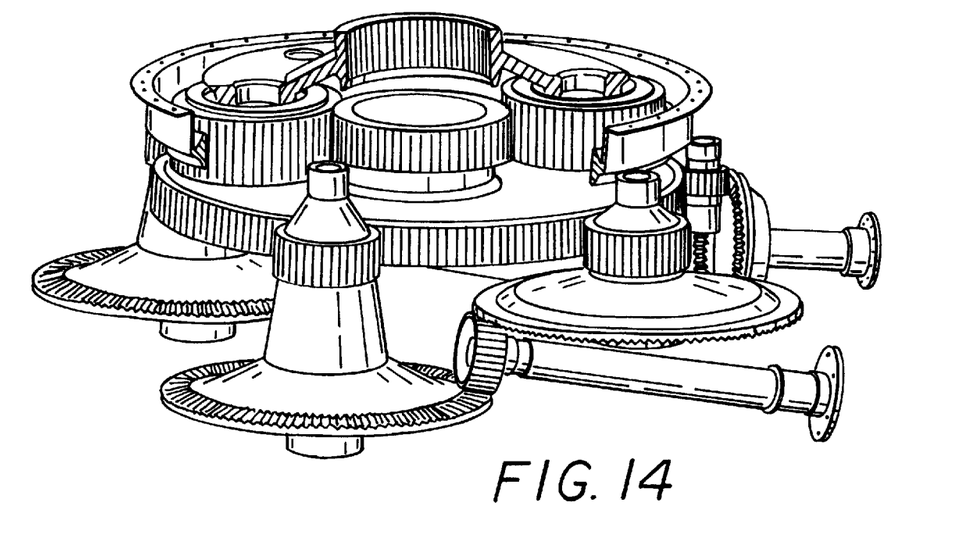
FIG. 14 illustrates a helicopter transmission comprising a number of face gears.

FIG. 14 illustrates a helicopter transmission design featuring the use of face gears for torque splitting, shift angle turning, and large ratio speed reduction. Face gears, as compared to prior art spiral bevel gears, for speed and torque transmission in angular drives posses unique performance and configuration advantages. These advantages can include higher feasible reduction ratios leading to simplified over-all structures of transmission systems; lower sensibility to machining and assembly errors; and lower costs in manufacturing.

The wire electric discharge machining method of the present invention can further be used to cut the face gear directly, since the face gear and the face-gear forging die have identical mathematical tooth surfaces. Controlling the motion of the cutting wire over the mathematical surface in the manner disclosed herein, one side of the surface can be considered as the gear and the opposite side can be considered as the die. Prototype gears or gears of small quantity can be efficiently generated using the present invention, since special cutting tools are not required. Instead, computer numerical control part programs tailored to the specific gears to be wire electric discharge machined can be generated and used. Although an exemplary embodiment of the invention has been shown and described, many other changes, modifications and substitutions, in addition to those set forth in the above paragraphs, may be made by one having ordinary skill in the art without necessarily departing from the spirit and scope of this invention.

What is claimed is:

1. A method of making a face gear comprising the following steps:
   providing a wire electronic discharge apparatus;
   forming a blank into a face-gear forging die using the wire electronic discharge apparatus, wherein a wire of the wire electronic discharge apparatus is passed through at least one point on a hyperbolic surface of the face gear forging die, the wire passing through the at least one point along a zero curvature orientation on the hyperbolic surface;
   heating a billet;
   placing the heated billet into contact with the face-gear forging die; and
   pressing the heated billet against the face-gear forging die, to thereby form the heated billet into a face gear.

2. The method as recited in claim 1, further comprising a step of heat-treating the face gear.

3. The method as recited in claim 2, further comprising a step of grinding the heat-treated face gear.

4. A method of forming a billet into a face gear, the method comprising the following steps:
   providing a face gear having at least one hyperbolic surface;
   approximating the hyperbolic surface of the face gear with a ruled surface, the ruled surface comprising a plurality of zero-curvature lines which approximate the hyperbolic surface of the face gear; and
   forming the approximated hyperbolic surface on the billet using a wire electronic discharge apparatus, to thereby form the face gear to thereby generate a face-gear forging die.

5. The method as recited in claim 4, the step of approximating the hyperbolic surface of a face gear with a ruled surface comprising a step of approximating the hyperbolic surface with a ruled surface which comprises a plurality of straight lines.

6. The method as recited in claim 5, the step of forming the approximated hyperbolic surface comprising a step of passing a wire of the wire electric discharge apparatus over each of the plurality of straight lines, to thereby form the approximated hyperbolic surface.

7. A method of manufacturing an object from a substrate material, the material comprising the following steps:
   generating a representation of an object having a curved, hyperbolic surface by applying a plurality of straight lines to the curved, hyperbolic surface, each of the plurality of straight lines being disposed substantially entirely on the curved, hyperbolic surface of the object;
   providing a substrate material; and
   manufacturing the substrate material into the representation of the object, the manufactured substrate material comprising a plurality of linear surfaces which correspond to the plurality of straight lines.

8. The method as recited in claim 7, wherein the step of manufacturing the substrate comprises a step of forming the ruled surface on the substrate material using a straight cutting device.

9. The method as recited in claim 7, wherein the step of providing a substrate material comprises a step of providing a metallic substrate material.

10. The method as recited in claim 9, wherein the step of manufacturing the substrate comprises a step of forming the ruled surface in the substrate material using a wire electric discharge apparatus.

11. The method as recited in claim 7, wherein the step of generating a representation of an object is proceeded by a step of providing a numerical representation of the curved, hyperbolic surface.

12. The method as recited in claim 11, wherein the step of generating a representation of a hyperbolic surface of an object further comprises the following steps:
   assigning a contact path along the hyperbolic surface;
   choosing a number of surface points on the contact path; and
   determining a zero-curvature line for each surface point, each zero-curvature line intersecting a corresponding surface point, each zero-curvature line corresponding to one of the plurality of straight lines.

13. The method as recited in claim 12, the step of assigning a contact path comprises a step of assigning a contact path that bisects a length of the object.

14. The method as recited in claim 13, wherein the step of manufacturing the substrate comprises a step of manufacturing the substrate material into a face-gear forging die, the face-gear forging die being constructed to facilitate forging of a face-gear tooth.

15. The method as recited in claim 13, wherein the step of manufacturing the substrate comprises a step of manufacturing the substrate material into a representation of a face-gear tooth.

16. The method as recited in claim 7, wherein:
   the step of generating a representation comprises a step of applying a plurality of straight lines to a modified surface, which is slightly different than the curved, hyperbolic surface; and
   the step of manufacturing the substrate material comprises a step of manufacturing the substrate material to have a surface which corresponds to the modified surface.

17. The method as recited in claim 16, wherein the step of manufacturing the substrate comprises a step of manufacturing the substrate material into a face-gear forging die, the face-gear forging die being constructed to facilitate forging of a face-gear tooth.

18. The method as recited in claim 16, wherein:
   the face-gear tooth is constructed to be heat-treated after being forged; and
   the step of applying a plurality of straight lines to a modified surface is proceeded by a step of modifying the curved, hyperbolic surface of the object to compensate for distortions in the face-gear tooth which occur as a result of the heat-treating of the face-gear tooth.

19. A method of forming a blank into a face-gear forging die, the face-gear forging die having a hyperbolic surface, the method comprising the following steps:
   approximating the hyperbolic surface of the face-gear forging die with a ruled surface;
   providing a wire discharge apparatus; and
   forming the approximated hyperbolic surface on the blank using a wire electronic discharge apparatus, to thereby generate a face-gear forging die, wherein a wire of the wire discharge apparatus is passed through at least one point on the hyperbolic surface, the wire passing through the at least one point along a zero curvature orientation on the hyperbolic surface.

20. The method as recited in claim 19, the step of approximating the hyperbolic surface of a face-gear forging die with a ruled surface comprising a step of approximating the hyperbolic surface with a ruled surface which comprises a plurality of straight lines.

21. The method as recited in claim 20, the step of forming the approximated hyperbolic surface comprising a step of passing a wire of the wire electric discharge apparatus over each of the plurality of straight lines, to thereby form the approximated hyperbolic surface.

22. A method manufacturing an object from a substrate material, the material comprising the following steps:

generating a representation of a surface of a face-gear forging die by mathematically applying a plurality of straight lines to the surface, each of the plurality of straight lines being disposed substantially entirely on the surface of the face-gear forging die;

providing a wire discharge apparatus;

providing a substrate material; and manufacturing the substrate material into the representation of the surface of the face-gear forging die, using the wire discharge apparatus, the manufactured substrate material comprising a plurality of linear surfaces which correspond to the plurality of straight lines.

23. The method as recited in claim 22, wherein the generating step comprises a step of generating a representation of a surface of a face-gear forging die by mathematically applying a plurality of straight lines to the surface which is not entirely planar, each of the plurality of straight lines being disposed substantially entirely on the surface of the face-gear forging die.

* * * * *